Patented Feb. 7, 1928.

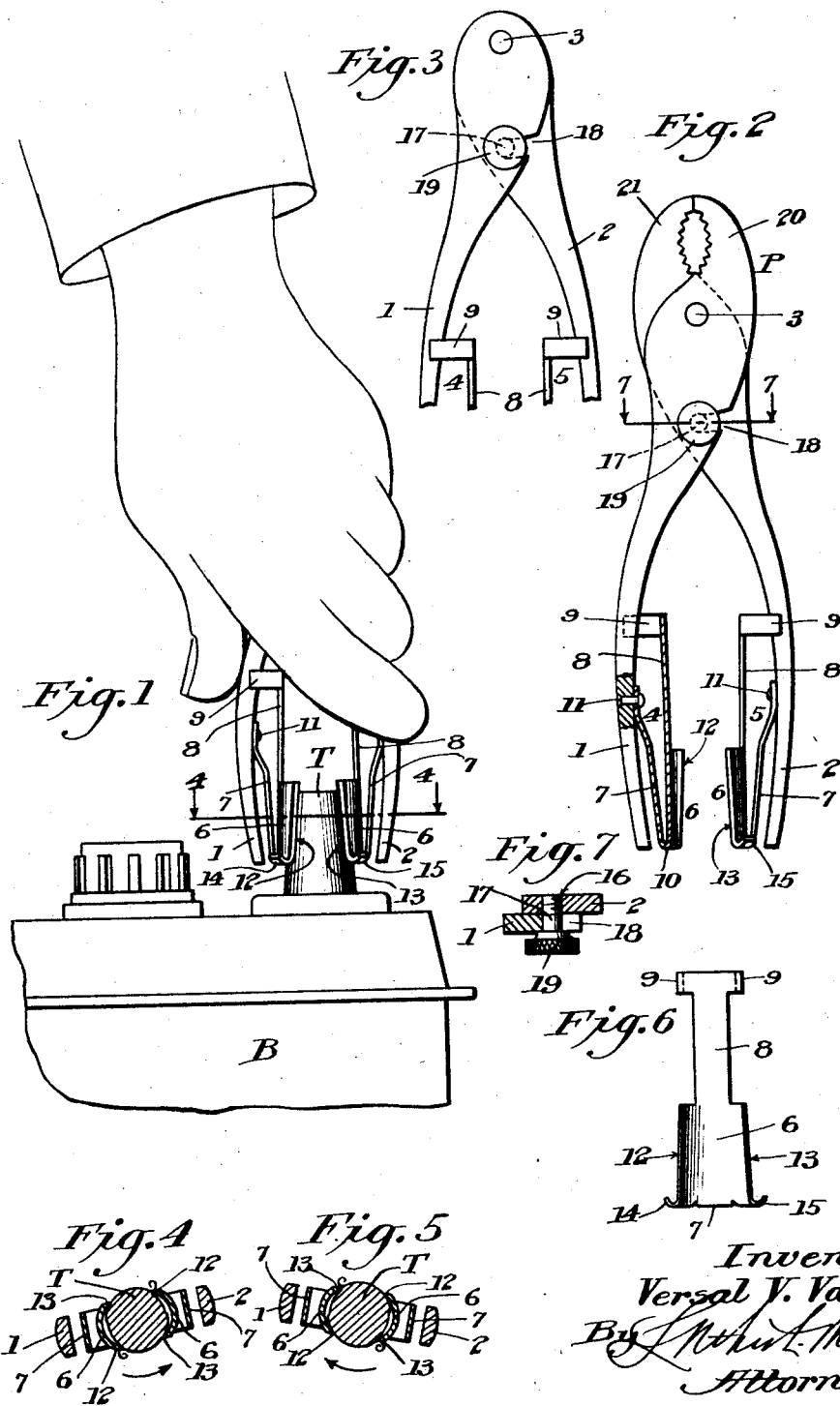

1,658,502

UNITED STATES PATENT OFFICE.

VERSAL V. VAUGHN, OF LOS ANGELES, CALIFORNIA.

TRIMMER.

Application filed October 19, 1925. Serial No. 63,346.

This invention relates to trimmers, and more particularly to a trimmer for trimming storage battery terminals and the like.

Trimmers now in use for trimming storage battery terminals are constructed for trimming the terminals to only one diameter, these trimmers having no means for varying the position of their blade to vary its cutting depth. It is necessary, however, at times to trim the terminals to different diameters so that connectors of different sizes may be fitted thereon.

Trimmers now in use are also awkward to handle because they have to be rotated a continuous revolution to trim a terminal, which necessitates releasing the hand and taking another grip on the trimmer after each revolution.

An important object of my invention is to provide a trimmer for trimming storage battery terminals to any desired diameter so that connectors of any size may be fitted thereon.

Another object is to provide a trimmer which will effectively trim storage battery terminals when rotated only 90 degrees alternately in opposite directions without releasing the hand from the device.

Another object is to provide a trimmer of the character stated which may be attached to and made a part of a pair of pliers.

Other objects will appear as the description progresses.

My invention is illustrated in the annexed drawing forming a part of this specification, in which:

Fig. 1 is a side elevation of my trimmer shown applied to a storage battery terminal and grasped by one's hand in the act of trimming said terminal.

Fig. 2 is a side elevation of one form of my trimmer as embodied in a pair of pliers.

Fig. 3 is a side elevation of another form of my trimmer with the pliers eliminated.

Figs. 4 and 5 are horizontal sections of my trimmer taken on line 4—4 of Fig. 1, showing the trimmer in the act of being turned alternately in opposite directions and trimming a storage battery terminal.

Fig. 6 is an inside view of one of the trimmer blade members.

Fig. 7 is a cross section of the trimmer taken on line 7—7 of Fig. 2.

Corresponding reference characters designate the same parts in all the views.

My invention includes a pair of pivoted handles 1 and 2 pivoted at one end at 3, and a pair of yieldable trimmer members 4 and 5 mounted on the inside of said handles respectively with the outer ends of said members coinciding with the swinging ends of said handles. Each trimmer member 4 and 5 is formed of a single piece of sheet metal and comprises a double-edged conical blade 6, a flat spring 7, a blade shank 8, and a pair of spaced fork arms 9 on its inner end, the member being bent backwardly upon itself at the juncture 10 of the outer ends of the blade and spring, the shank 8 extending inwardly from the inner end of the blade and the arms 9 being bent from the side edges of the shank at the inner end thereof and at right angles thereto. The springs 7 of the trimmer members 4 and 5 are secured at their inner ends by rivets 11 to the inner edges of the handles 1 and 2 respectively, with the outer ends of the trimmer members or junctures 10 coinciding with the outer ends of the handles and with the arms 9 of the trimmer members straddling the handles respectively, from the inner edges thereof so that said arms engage the opposite sides of said handles. The opposite side edges of the blades 6 are sharpened to the inner surface of the blades to form blade edges 12 and 13, which edges converge from the outer to the inner ends of the blades owing to the conical shape of the blades. The cross sectional curvature of the blades is of less radius than the radius of the conical lead terminal T of the storage battery B, so that the inner surface of the blades will be spaced from the surface of the terminal and only the blade edges 12 and 13 of the trimmer blades 6 will contact with the surface of the terminal in true trimming relation to the terminal. The blades 6 are wider than the springs 7 and the lower ends 14 and 15 of the blades outside the side edges of the springs are bent outwardly and upwardly so that said ends will not cut the hand of the user of the device.

The springs 7 except at their points of attachment at their inner ends to the handles 1 and 2, rest inwardly from the handles in spaced relation thereto so that the blades 6 may yield outwardly to fit the terminal T or when the handles are compressed inwardly with too great a force.

The handle 2 is provided with a threaded aperture 16 to receive a screw 17 which extends through a slot 18 in the member 1, the screw having a knurled head 19 for engaging the handle 1 to hold the handles 1 and 2 and the trimmer blades 6 apart at a predetermined distance for trimming the terminal to a predetermined diameter.

My trimmer may be embodied in a pair of pliers P as shown in Fig. 2, the plier handles and their pivot corresponding to the handles 1 and 2 and pivot 3 above described, and the plier jaws 20 and 21 being formed on the pivoted ends of said handles. The blades 6 may be limited to their smallest cutting diameter by the engagement of the jaws 20 and 21 in closed position.

In operation the blades 6 are slipped over the terminal T, the handles 1 and 2 grasped by the operator's hand and the device turned 90 degrees first in one direction and then in the other, as shown in Figs. 4 and 5 respectively. When turned counter-clockwise as shown in Fig. 4 the two blade edges 12 trim respectively 90 degrees each or 180 degrees of the surface of the terminal and when the device is reversed and turned 90 degrees clockwise the remaining 180 degrees of the terminal is trimmed by the edges 13, thus completely trimming the terminal in two one quarter turns of the device alternately in opposite directions.

The diameter to which the terminal is trimmed depends upon the pressure applied to the handles 1 and 2 or the distance to which the handles are held apart, which distance may be fixed by tightening the screw 17.

While I have shown and described a preferred embodiment of my invention, it will be understood that I may change or modify the same within the scope of the appended claims without departing from the spirit thereof.

What I claim is:

1. A trimmer of the character described comprising a pair of plier members pivoted together intermediate the handles and jaws and forming supporting members and a pair of sheet metal blades mounted on the inner sides of said handles in opposition to each other, said blades having central arcuate portions with cutting edges thereon, and being spaced apart for engaging opposite portions of the work to be trimmed.

2. The trimming tool comprising a pair of pliers, members pivoted together at a point intermediate the handles and jaws and forming supporting members and a pair of sheet metal trimmers resiliently mounted on the inner sides of said handles and in opposition to each other, said trimmers having extensions attached to said handles, trimming blades of arcuate cross section arranged for engagement with opposite portions of the work to be trimmed, and extensions from said blades engaging the sides of said handles for holding the blades in operative position.

3. A trimming tool comprising a pair of pivoted supporting members and a pair of trimmers mounted thereon in opposition to each other, said trimmers having extensions attached to said supporting members for resiliently supporting the same, and arcuate blades capable of being spread apart and resiliently held in contact with opposite portions of the work to be trimmed, said blades being formed on a radius less than the radius of the work.

VERSAL V. VAUGHN.